US006939263B2

(12) United States Patent
Wakashiro et al.

(10) Patent No.: US 6,939,263 B2
(45) Date of Patent: Sep. 6, 2005

(54) CONTROL DEVICE FOR HYBRID VEHICLE

(75) Inventors: Teruo Wakashiro, Shioya-gun (JP); Atsushi Matsubara, Utsunomiya (JP); Toshinari Shinohara, Utsunomiya (JP); Hideyuki Takahashi, Utsunomiya (JP); Yasuo Nakamoto, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 83 days.

(21) Appl. No.: 10/478,303

(22) PCT Filed: May 23, 2002

(86) PCT No.: PCT/JP02/05004

§ 371 (c)(1), (2), (4) Date: Dec. 3, 2003

(87) PCT Pub. No.: WO02/101219

PCT Pub. Date: Dec. 19, 2002

(65) Prior Publication Data

US 2004/0147364 A1 Jul. 29, 2004

(30) Foreign Application Priority Data

Jun. 11, 2001 (JP) ....................................... 2001-175789

(51) Int. Cl.[7] ............................ B60K 1/02; B60K 1/00; F02B 77/00

(52) U.S. Cl. ....................... 477/3; 180/65.2; 123/198 F

(58) Field of Search ............................. 477/3, 104, 110, 477/904; 123/198 F, 481; 180/65.2–65.4

(56) References Cited

U.S. PATENT DOCUMENTS 6,305,757 B1 10/2001 Ohsaki et al.
6,334,079 B1 * 12/2001 Matsubara et al. ........ 180/65.2
6,575,146 B1 * 6/2003 Kanai et al. ................ 123/520
6,722,230 B2 * 4/2004 Sakamoto et al. ............. 477/3

FOREIGN PATENT DOCUMENTS

| | | |
|---|---|---|
| EP | 0926032 A2 | 6/1999 |
| JP | 58-214639 | 12/1983 |
| JP | 11-101140 | 4/1999 |
| JP | 11-182278 | 7/1999 |
| JP | 2000-97068 | 4/2000 |
| JP | 2000-125405 | 4/2000 |
| JP | 2001-140665 | 5/2001 |

* cited by examiner

*Primary Examiner*—Roger Pang
(74) *Attorney, Agent, or Firm*—Armstrong, Kratz, Quintos, Hanson & Brooks, LLP

(57) ABSTRACT

A control device for a hybrid vehicle which enables an improvement in fuel consumption by means of a cylinder deactivation operation while maintaining brake performance. The hybrid vehicle has an engine (E) and a motor (M) for outputting power for driving the vehicle, wherein a regenerative brake is used during deceleration traveling of the vehicle in accordance with a deceleration state thereof, and the engine (E) includes at least one deactivatable cylinder which is deactivatable during deceleration traveling of the vehicle. The control device comprises: a deactivation determining section for determining whether the deactivatable cylinder is allowed to be deactivated in accordance with a traveling state of the vehicle; a deactivation cancellation determining section for canceling cylinder deactivation during deactivation operation; an intake pressure sensor (S1); a master vac negative pressure sensor (S3); and a control valve (34) for opening/closing a secondary air passage (33) for providing auxiliary air into the intake passage (30), wherein the control valve (34) is closed when the intake pressure is a negative value lower than a predetermined threshold during deceleration traveling of the vehicle.

7 Claims, 9 Drawing Sheets

CONTROL DEVICE FOR HYBRID VEHICLE

BACKGROUND OF THE INVENTION

1. Field of the Invention

The present invention relates to a control device for a parallel type hybrid vehicle having an engine with deactivatable cylinders, and in particular, relates to a control device for a hybrid vehicle, which enables an improvement in fuel consumption while maintaining brake performance.

2. Description of the Related Art

A hybrid vehicle having not only an engine but also an electric motor as the drive source has been known in the art. As a type of hybrid vehicle, a parallel hybrid vehicle is known that uses an electric motor as an auxiliary drive source for assisting the engine output.

In the parallel hybrid vehicle, the power of the engine is assisted by the electric motor during acceleration traveling. On the other hand, during deceleration traveling, the battery and the like are charged via a deceleration regenerating operation. According to various control operations including the above, the remaining battery charge (remaining electric energy) of the battery is maintained while also satisfying the driver's demands. Because the drive train of the parallel hybrid vehicle comprises the engine and the motor coupled to the engine in series, the whole system is simple in structure, light in weight, and has great flexibility for installation in the vehicle.

As variations of the parallel hybrid vehicle, two types of hybrid vehicles are known; one is disclosed in, for example, Japanese Unexamined Patent Application, First Publication No. 2000-97068, in which a clutch is disposed between the engine and the motor in order to eliminate the effect of engine friction (i.e., engine brake) during the deceleration regenerating operation; the other is disclosed in, for example, Japanese Unexamined Patent Application, First Publication No. 2000-125405, in which the engine, the motor, and a transmission are directly connected in series in order to ultimately simplify the structure.

The hybrid vehicle of the former type exhibits disadvantages in that the installability of the power train is degraded due to the complexity in the constitution of the clutch, and the transmission efficiency of the power train may be reduced during normal traveling as well due to the use of the clutch. On the other hand, the hybrid vehicle of the latter type exhibits a disadvantage in that the driving power assisted by the electric motor (assisted power) is restricted because regenerated electric energy is reduced due to the aforementioned engine friction.

As another measure to reduce the engine friction during deceleration, an electronic control throttle mechanism may be used which controls a throttle valve to be open during deceleration so as to greatly reduce the pumping loss and to increase the regenerative energy; however, a considerable amount of new air directly flows into the exhaust system during deceleration, which may lower the temperature of a catalyst and an air flow sensor and could cause inappropriate exhaust gas control.

A cylinder deactivation technique has been proposed to solve the above problem; however, the cylinder deactivation period is limited in order to retain a sufficient negative pressure in the master vac for the brake system, and consequently, not much regenerative energy can be saved by the reduction of engine friction.

SUMMARY OF THE INVENTION

In consideration of the above circumstances, an objective of the present invention is to provide a control device for a hybrid vehicle which can provide a more frequent cylinder deactivation operation while maintaining the brake performance and enables a great improvement in the fuel consumption of the vehicle due to a reduction of engine friction.

To this end, a first aspect of the present invention provides a control device for a hybrid vehicle having an engine and a motor for outputting power for driving the vehicle, wherein a regenerative brake is used during deceleration traveling of the vehicle in accordance with a deceleration state thereof, and the engine includes at least one deactivatable cylinder which is deactivatable during deceleration traveling of the vehicle. The control device comprises: a deactivation determining section for determining whether the deactivatable cylinder is allowed to be deactivated in accordance with a traveling state of the vehicle; a deactivation cancellation determining section for canceling cylinder deactivation during deactivation operation; an intake pressure sensing section for measuring air pressure in an intake passage of the engine; and a control valve operating section for opening/closing a secondary air passage of the engine for providing auxiliary air into the intake passage by operating a secondary air valve, wherein the control valve operating section operates the secondary air valve so as to close the secondary air passage when the intake pressure measured by the intake pressure sensing section is a negative value lower than a predetermined first threshold during deceleration traveling of the vehicle.

Accordingly, because the control valve operating section operates the secondary air valve so as to close the secondary air passage when the intake pressure is a negative value lower than the predetermined first threshold at the instance of starting deceleration traveling, the intake depression of the engine can be efficiently utilized to ensure the negative pressure in the master vac is sufficiently low.

A second aspect of the present invention provides a control device for a hybrid vehicle having an engine and a motor for outputting power for driving the vehicle, wherein a regenerative brake is used during deceleration traveling of the vehicle in accordance with a deceleration state thereof, and the engine includes at least one deactivatable cylinder which is deactivatable during deceleration traveling of the vehicle. The control device comprises: a deactivation determining section for determining whether the deactivatable cylinder is allowed to be deactivated in accordance with a traveling state of the vehicle; a deactivation cancellation determining section for canceling cylinder deactivation during deactivation operation; a master vac negative pressure sensing section for measuring negative pressure in a master vac which communicates with an intake passage of the engine and which assists a braking force by means of intake depression in accordance with the braking operation by the operator of the vehicle; and a control valve operating section for opening/closing a secondary air passage of the engine for providing auxiliary air into the intake passage by operating a secondary air valve, wherein the control valve operating section operates the secondary air valve so as to close the secondary air passage when the negative pressure in the master vac measured by the master vac negative pressure sensing section is a negative value higher than a predetermined second threshold during deceleration traveling of the vehicle.

Accordingly, because the control valve operating section operates the secondary air valve so as to close the secondary air passage when the negative pressure in the master vac is a negative value higher than the predetermined second threshold at the instance of starting deceleration traveling, the intake depression of the engine can be efficiently utilized to decrease the negative pressure in the master vac to a sufficiently low value.

A third aspect of the present invention provides a control device for a hybrid vehicle having an engine and a motor for outputting power for driving the vehicle, wherein a regenerative brake is used during deceleration traveling of the vehicle in accordance with a deceleration state thereof, and the engine includes at least one deactivatable cylinder which is deactivatable during deceleration traveling of the vehicle. The control device comprises: a deactivation determining section for determining whether the deactivatable cylinder is allowed to be deactivated in accordance with a traveling state of the vehicle; a deactivation cancellation determining section for canceling cylinder deactivation during deactivation operation; an intake pressure sensing section for measuring air pressure in an intake passage of the engine; a master vac negative pressure sensing section for measuring negative pressure in a master vac which communicates with an intake passage of the engine and which assists a braking force by means of intake depression in accordance with the braking operation by the operator of the vehicle; and a control valve operating section for opening/closing a secondary air passage of the engine for providing auxiliary air into the intake passage by operating a secondary air valve, wherein the control valve operating section operates the secondary air valve so as to close the secondary air passage when the intake pressure measured by the intake pressure sensing section is a negative value lower than a predetermined first threshold and the negative pressure in the master vac measured by the master vac negative pressure sensing section is a negative value higher than a predetermined second threshold during deceleration traveling of the vehicle.

Accordingly, the intake depression of the engine can be efficiently utilized to decrease the negative pressure in the master vac to a sufficiently low value when the negative pressure in the master vac is not sufficiently low prior to the cylinder deactivation operation.

A fourth aspect of the present invention provides a control device for a hybrid vehicle, wherein the control valve operating section operates the secondary air valve so as to close the secondary air passage when cylinder deactivation is prohibited by the deactivation determining section.

Accordingly, the secondary air valve is closed so that the intake negative pressure can be ensured to be sufficiently low prior to the cylinder deactivation operation.

A fifth aspect of the present invention provides a control device for a hybrid vehicle, wherein the predetermined first threshold is determined in accordance with a running speed of the engine.

Accordingly, the predetermined first threshold is appropriately determined in accordance with the running speed of the engine.

A sixth aspect of the present invention provides a control device for a hybrid vehicle, wherein the second threshold is determined in accordance with a traveling speed of the vehicle.

Accordingly, the second threshold is appropriately determined in accordance with the traveling speed of the vehicle, where the second threshold relates to the negative pressure in the master vac which is utilized to decrease the traveling speed of the vehicle.

A seventh aspect of the present invention provides a control device for a hybrid vehicle, wherein the control system further comprises a deceleration state determining section for determining a degree of deceleration of the vehicle, and wherein the deactivation cancellation determining section cancels the cylinder deactivation when the degree of deceleration exceeds a predetermined value.

Accordingly, stopping of the vehicle may be set to have highest priority, therefore, a cylinder deactivation operation is not executed when the degree of deceleration is considered to be great.

BRIEF DESCRIPTION OF THE DRAWINGS

FIG. 9A shows a cross-section of the main part of the variable valve timing mechanism in a cylinder activation state, and FIG. 9B shows a cross-section of the main part of the variable valve timing mechanism in a cylinder deactivation state.

DESCRIPTION OF THE PREFERRED EMBODIMENTS

Preferred embodiments of the present invention will now be explained with reference to the appended drawings.

Figure 1:
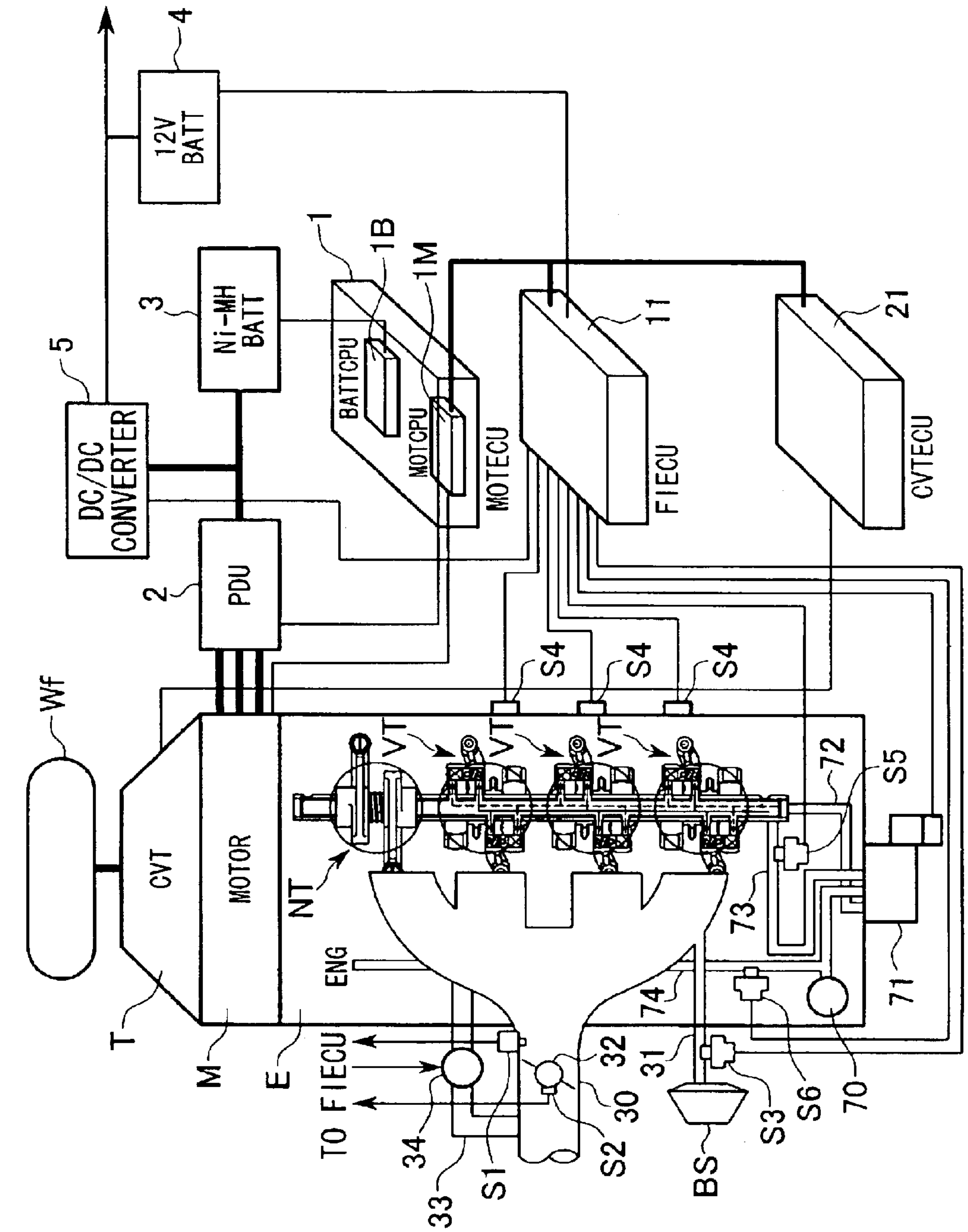
FIG. 1 is a block diagram showing the general structure of a hybrid vehicle in an embodiment according to the present invention.

FIG. 1 is a block diagram schematically illustrating a parallel hybrid vehicle to which the embodiments of the present invention are applied, and which comprises an engine E, an electric motor M, and a transmission T directly coupled to each other in series. The driving force generated by both the engine E and the electric motor M is transmitted via, for example, a CVT (continuously variable transmission) as the transmission T (the transmission T may be a manual transmission) to front wheels Wf as driving wheels.

When the driving force is transmitted from the driving wheels Wf to the electric motor M during deceleration of the hybrid vehicle, the electric motor M functions as a generator for applying a so-called regenerative braking force to the vehicle, i.e., the kinetic energy of the vehicle is recovered and stored as electric energy.

The driving of the motor M and the regenerating operation of the motor M are controlled by a power drive unit (PDU) 2 according to control commands from a motor CPU 1 M of a motor ECU 1. A high-voltage nickel metal hydride battery 3 for sending and receiving electric energy to and from the motor M is connected to the power drive unit 2. The battery 3 includes a plurality of modules connected in series, and in each module, a plurality of cell units are connected in series. The hybrid vehicle includes a 12-volt auxiliary battery 4 for energizing various accessories. The auxiliary battery 4 is connected to the battery 3 via a downverter 5 or a DC-DC converter. The downverter 5, controlled by an FIECU 11 (a part of the control valve operating section), makes the voltage from the battery 3 step-down and charges the auxiliary battery 4. The motor ECU 1 comprises a battery CPU 1B for protecting the battery 3 and calculating the remaining battery charge thereof. In addition, a CVTECU 21 is connected to the transmission T, which is a CVT, for controlling the same.

The FIECU 11 controls, in addition to the motor ECU 1 and the downverter 5, a fuel supply amount controller (not shown) for controlling the amount of fuel supplied to the engine E, a starter motor (not shown), ignition timing, etc. To this end, the FIECU 11 receives various signals such as a signal from a speed sensor for sensing vehicle speed, a signal from an engine revolution speed sensor for sensing engine revolution speed, a signal from a shift position sensor for sensing the shift position of the transmission T, a signal from a brake switch for detecting the operation of a brake pedal, a signal from a clutch switch for detecting the operation of a clutch pedal, a signal from a throttle opening-degree sensor for sensing the degree of opening of a throttle valve 32, a signal from an intake negative pressure sensor for sensing negative pressure in the air-intake passage, a signal from a knocking sensor, and the like.

In FIG. 1, reference symbol BS indicates a booster associated with the brake pedal, in which a master vac negative pressure sensor is provided for sensing negative pressure in the brake master vac (hereinafter referred to as master vac negative pressure). The master vac negative pressure sensor is connected to the FIECU 11.

For the purpose of clarification, only an intake negative pressure sensor S1 (a part of an intake pressure sensing section) provided in an air-intake passage 30, a throttle opening-degree sensor S2, a master vac negative pressure sensor S3 (a part of the master vac negative pressure sensing section) provided with a communication passage 31 connected to the air-intake passage 30, and a knocking sensor S4 are shown in FIG. 1.

The air-intake passage is provided with a secondary air passage 33 for air communication between the upstream portion with respect to the throttle valve 32 and the downstream portion, and the secondary air passage 33 is provided with a control valve 34 or a secondary air control valve. The purpose of providing the secondary air passage 33 is to supply a small amount of air into the cylinders even when the air-intake passage 30 is completely closed by the throttle valve 32. The control valve 34 is controlled by means of the signal from the FIECU 11 in accordance with the intake negative pressure measured by the intake negative pressure sensor S1. A POIL (oil pressure) sensor S5, a solenoid of a spool valve 71, and a TOIL (oil temperature) sensor S6, all of which will be explained below, are also connected to the FIECU 11. The knocking sensors S4 are provided for detecting a misfire state in the cylinders having a variable valve timing mechanism VT.

The engine E includes three cylinders associated with the variable valve timing mechanism VT on both an intake side and an exhaust side, and a cylinder associated with a conventional valve mechanism which has no relation to the cylinder deactivation operation.

In other words, the engine E is a deactivatable engine in which the operation state may be alternated between normal operation in which all four cylinders including three deactivatable cylinders are active and a cylinder deactivation operation in which three deactivatable cylinders are inactive. In the engine E, the operation of the intake valves IV and exhaust valves EV associated with the deactivatable cylinders can be temporarily stopped by means of the variable valve timing mechanism VT.

Next, the variable valve timing mechanism VT will be explained in detail with reference to FIGS. 8 to 10.

Figure 8:
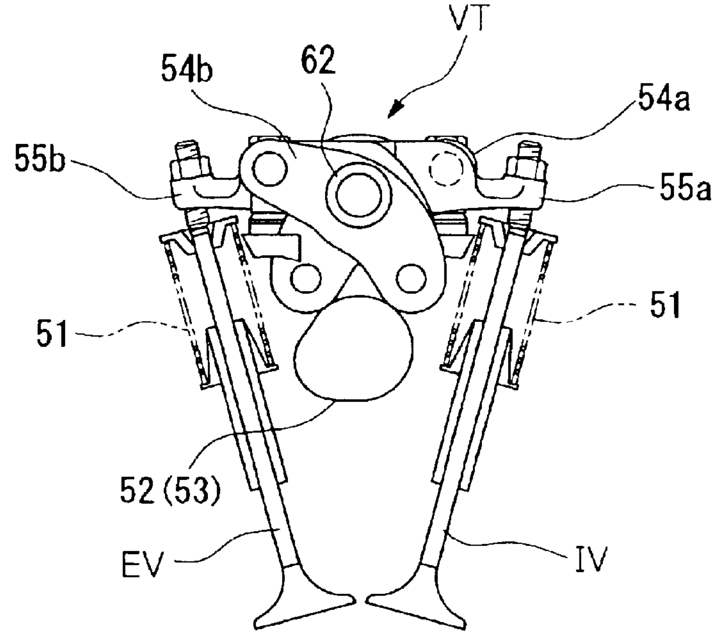
FIG. 8 is a front view showing a variable valve timing mechanism used in an embodiment of the present invention.

FIG. 8 shows an example of an SOHC engine provided with the variable valve timing mechanism VT which is adapted for a cylinder deactivation operation. The cylinder (not shown) is provided with the intake valve IV and the exhaust valve EV which are biased by valve springs 51 in a direction which closes the intake port (not shown) and exhaust port (not shown), respectively. Reference symbol 52 indicates a lift cam provided on a camshaft 53. The lift cam 52 is engaged with an intake cam lifting rocker arm 54*a* for lifting the intake valve and an exhaust cam lifting rocker arm 54*b* for lifting the exhaust valve, both of which are rockably supported by a rocker arm shaft 62.

Figure 9A:
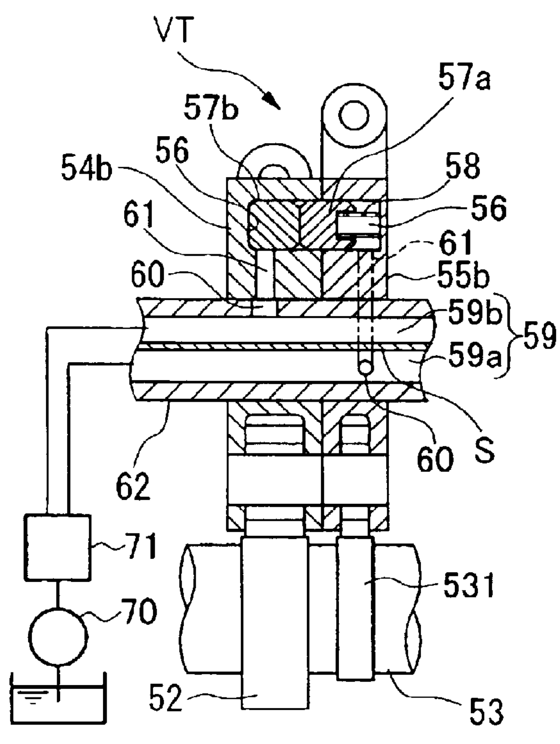
FIGS. 9A and 9B show the variable valve timing mechanism used in the embodiment of the present invention; in particular.
Figure 9B:
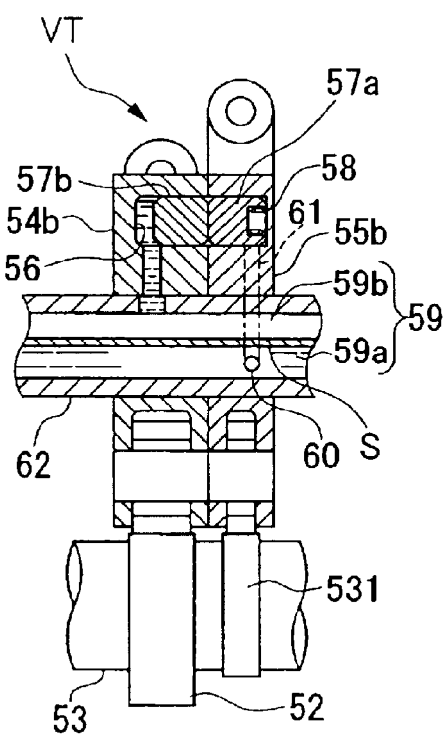

The rocker arm shaft 62 also supports valve operating rocker arms 55*a* and 55*b* in a rockable manner, which are located adjacent to the cam lifting rocker arms 54*a* and 54*b*, and whose rocking ends press the top ends of the intake valve IV and the exhaust valve EV, respectively, so that the intake valve IV and the exhaust valve EV open their respective ports. As shown in FIGS. 9A and 9B, the proximal ends (opposite the ends contacting the valves) of the valve operating rocker arms 55*a* and 55*b* are adapted so as to be able to engage a circular cam 531 provided on the camshaft 53.

FIGS. 9A and 9B show, as an example, the cam lifting rocker arm 54*b* and the valve operating rocker arm 55*b* provided in the exhaust valve side.

As shown in FIGS. 9A and 9B, a hydraulic chamber 56 is formed in the cam lifting rocker arm 54*b* and the valve operating rocker arm 55*b* in a continuous manner, which is located on the opposite side of the rocker arm shaft 62 with respect to the lift cam 52. The hydraulic chamber 56 is provided with a pin 57*a* and a disengaging pin 57*b* both of which are slidable and biased toward the cam lifting rocker arm 54*b* by means of a pin spring 58.

The rocker arm shaft 62 is provided with, in its inside, a hydraulic passage 59 which is divided into hydraulic passages 59*a* and 59*b* by a partition S. The hydraulic passage 59*a* is connected to the hydraulic chamber 56 at the position where the disengaging pin 57*b* is located via an opening 60 of the hydraulic passage 59*b* and a communication port 61 in the cam lifting rocker arm 54*b*. The hydraulic passage 59*b* is connected to the hydraulic chamber 56 at the position where the pin 57*a* is located via an opening 60 of the hydraulic passage 59*a* and a communication port 61 in the valve operating rocker arm 55*b*, and is adapted to be further connectable to a drain passage (not shown).

As shown in FIG. 9A, the pin 57*a* is positioned by the pin spring 58 so as to bridge the cam lifting rocker arm 54*b* and the valve operating rocker arm 55*b* when hydraulic pressure is not applied via the hydraulic passage 59*b*. On the other hand, when hydraulic pressure is applied via the hydraulic passage 59*b* in accordance with a cylinder deactivation signal, both of the pin 57*a* and the disengaging pin 57*b* slide toward the valve operating rocker arm 55*b* against the biasing force of the pin spring 58, and the interface between the pin 57*a* and the disengaging pin 57*b* corresponds to the interface between the cam lifting rocker arm 54*b* and the valve operating rocker arm 55*b* to disconnect these rocker arms 54*b* and 55*b*, as shown in FIG. 9B. The intake valve side is also constructed in a similar manner. The hydraulic passages 59*a* and 59*b* are connected to an oil pump 70 via the spool valve 71 which is provided for ensuring hydraulic pressure of the variable valve timing mechanism VT.

Figure 10:
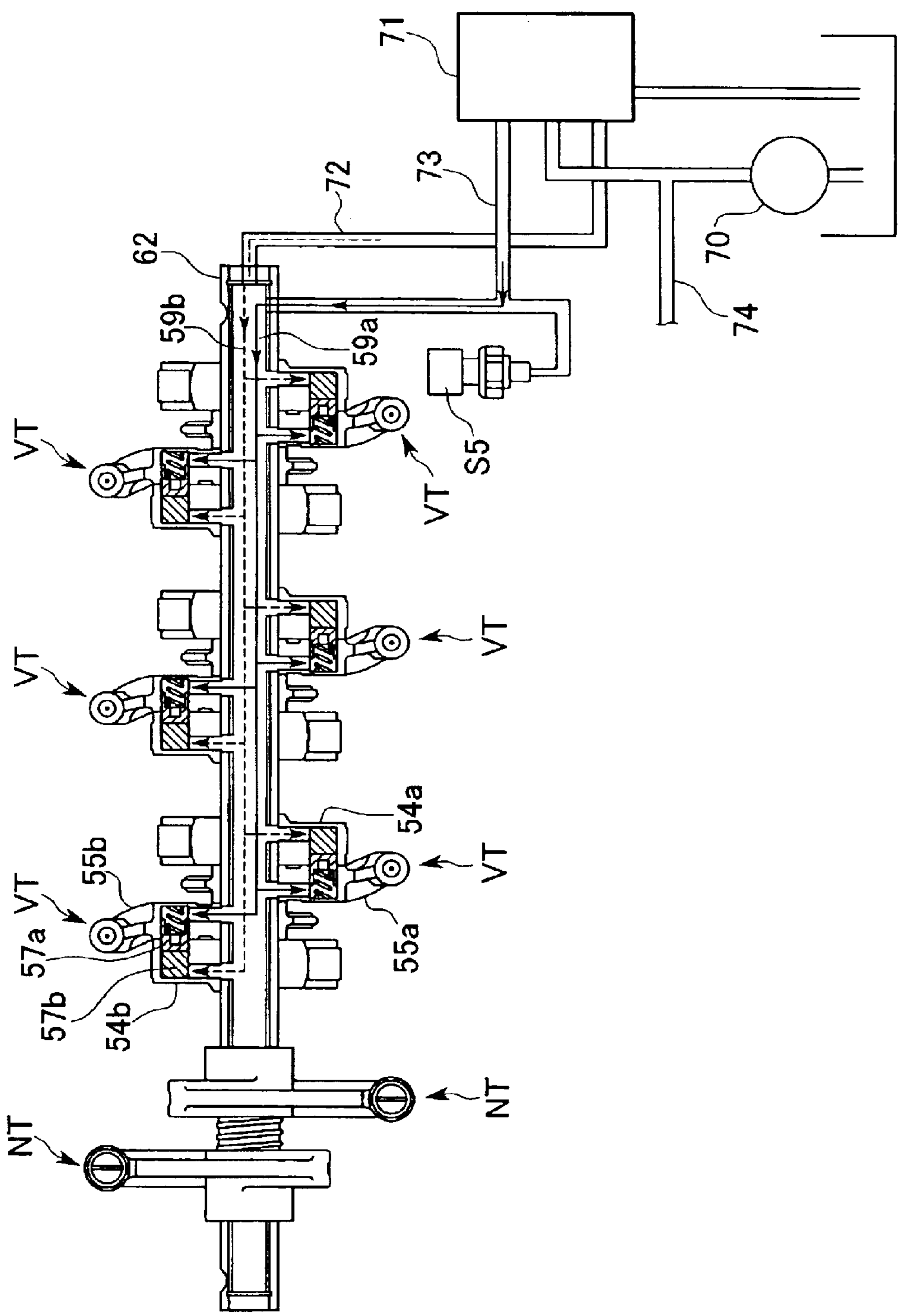
FIG. 10 is an enlarged view of the main part in FIG. 1.

As shown in FIG. 10, a passage for deactivation 72 branching from the spool valve 71 is connected to the hydraulic passage 59*b* in the rocker arm shaft 62, and a passage for canceling deactivation 73 branching from the spool valve 71 is connected to the hydraulic passage 59*a*. The POIL sensor S5 is connected to the passage for canceling deactivation 73. The POIL sensor S5 monitors hydraulic pressure in the passage for canceling deactivation 73, which exhibits low values during a deactivation operation and exhibits high values during normal operation. The TOIL sensor S6 (shown in FIG. 1) is connected to an oil supplying passage 74 which branches from a passage connecting the outlet of the oil pump 70 and the spool valve 71 and which supplies operating oil to the engine E so as to monitor the temperature of the operating oil.

When the condition for entering into a cylinder deactivation operation, which will be described below, is satisfied, the spool valve 71 is operated in accordance with a signal from the FIECU 11, and hydraulic pressure is applied to the hydraulic chamber 56 via the oil pump 70 and the hydraulic passage 59*b* in both the intake valve and exhaust valve sides. Subsequently, the pins 57*a*, which have been bridging the cam lifting rocker arms 54*a*, 54*b* and the valve operating rocker arms 55*a*, 55*b* together with the disengaging pin 57*b*, slide toward the valve operating rocker arms 55*a*, 55*b*, and the cam lifting rocker arms 54*a*, 54*b* and the valve operating rocker arms 55*a*, 55*b* are disconnected.

In this state, although the cam lifting rocker arms 54*a* and 54*b* are driven by the rotating lift cam 52, the movements are not transmitted to the valve operating rocker arms 55*a* and 55*b* which have been disconnected from the cam lifting rocker arms 54*a* and 54*b*. As a result, because the valve operating rocker arms 55*a* and 55*b* are not driven and the intake valve IV and the respective ports of the exhaust valve EV remain closed, a cylinder deactivation operation of the engine can be performed.

Operation for Switching into Cylinder Deactivation Operation

Now, the operation for switching into a cylinder deactivation operation will be explained with reference to FIG. 2.

The term "cylinder deactivation operation" herein means an engine operation state in which both of the intake and exhaust valves remain in their closing positions by means of the variable valve timing mechanism VT under predetermined conditions during regenerative deceleration, and it is performed in order to reduce engine friction and to increase the energy regenerated during deceleration. In the flowchart shown in FIG. 2, a flag (i.e., cylinder deactivation executing flag F_ALCS included in a deactivation determining section) used to alternate the engine operation state between a cylinder deactivation operation and normal operation in which all cylinders are active is set and reset at a predetermined period.

In step S100A, it is determined whether the value of a flag F_GDECCS (included in a deceleration state determining section) is "1". The flag F_GDECCS is provided since cancellation of the cylinder deactivation operation is required when the degree of deceleration is relatively great. When the result of the determination in step S100A is "YES", the operation proceeds to step S114, and when the result is "NO", the operation proceeds to step S100B.

In step S100B, it is determined whether the value of a flag F_GDECMA (included in the deceleration state determining section) is "1". The flag F_GDECMA is provided since cancellation of regenerative deceleration is required when the degree of deceleration is relatively great. When the result of the determination in step S100A is "YES", the operation proceeds to step S114, and when the result is "NO", the operation proceeds to step S101. The reason for providing the determination in step S100A is that it is better not to execute the cylinder deactivation operation when stopping of the vehicle has the highest priority.

When a braking operation of high deceleration is applied, negative pressure in the master vac is greatly reduced (i.e., the absolute pressure is increased), and subsequently, there is a high possibility that the engine operation state may return to normal operation from the cylinder deactivation operation with a high possibility (the logic will be discussed below in relation to step S160); therefore, the cylinder deactivation operation should be cancelled during high deceleration traveling.

The reason for providing the determination in step S100B is that it is better not to execute the cylinder deactivation operation in order to protect the battery from a rapidly increased regenerative electric energy during high deceleration traveling. The flag F_GDECCS and the flag F_GDECMA are flags which are set to be "1" when the degree of deceleration is equal to or greater than a predetermined value (for example, $0.3 \times 9.8$ m/s$^2$). The degree of deceleration is calculated based on a fluctuation of engine revolution NE and a fluctuation of vehicle speed measured by wheel speed sensors. Steps S100A and S100B constitute the deceleration state determining section. The degree of deceleration may be measured by an accelerometer (not shown).

In step S101, it is determined whether designated fail-safe signals have been detected. When the result of the determination in step S101 is "NO", the operation proceeds to step S102, and when the result is "YES", the operation proceeds to step S114. The operation should proceed in this way because it is better not to execute the cylinder deactivation operation when the engine has some abnormalities.

In step S102, it is determined whether a flag F_ALCSSOL is "1". When the flag F_ALCSSOL is "1", it means that the solenoid for a cylinder deactivation operation in the spool valve 71 is ON. When the result of the determination in step S102 is "YES", the operation proceeds to step S105, and when the result is "NO", the operation proceeds to step S103. In step S103, as will be explained below, it is determined whether the pre-deactivation conditions permitting the cylinder deactivation operation are satisfied (F_ALCSSTB_JUD); then, the operation proceeds to step S104. The cylinder deactivation operation is executed only when the pre-deactivation conditions are satisfied in step S103.

In step S104, it is determined whether the value of a cylinder deactivation stand-by flag F_ALCSSTB is "1". The flag F_ALCSSTB is set to be "1" when the pre-deactivation conditions are satisfied in step S103, and is set to be "0" when the pre-deactivation conditions are not satisfied. According to the flag F_ALCSSTB, it is determined whether or not a cylinder deactivation operation may be executed in accordance with the operation state of the vehicle. When the result of the determination in step S1104 is "YES", which means that the pre-deactivation conditions are satisfied, the operation proceeds to step S105, and when the result is "NO", which means that the pre-deactivation conditions are not satisfied, the operation proceeds to step S114.

In step S105, as will be explained below, it is determined whether the deactivation cancellation conditions are satisfied (F_ALCSSTP JUD); then, the operation proceeds to step S106. When the deactivation cancellation conditions are satisfied in step S105, the cylinder deactivation operation will not be executed. In contrast to the judgment on the pre-deactivation conditions, the judgment on the deactivation cancellation conditions is always performed (continuously monitored), when the operation shown in FIG. 2 is executed.

In step S106, it is determined whether the value of a deactivation cancellation flag F_ALCSSTP is "1". The deactivation cancellation flag F_ALCSSTP (included in the deactivation cancellation determining section) is set to be "1" when the deactivation cancellation conditions are satisfied in step S105, and is set to be "0" when the deactivation cancellation conditions are not satisfied. According to the flag F_ALCSSTP, it is determined whether or not the cylinder deactivation operation may be cancelled in accordance with the operation state of the vehicle during the cylinder deactivation operation of the engine. When the result of the determination in step S106 is "YES", which means that the cancellation conditions are satisfied, the operation proceeds to step S114, and when the result is "NO", which means that the cancellation conditions are not satisfied, the operation proceeds to step S107.

In step S107, it is determined whether the value of a solenoid ON delay timer TALCSDL1, as will be explained below, is "0". When the result of the determination in step S107 is "YES", which means that a predetermined period has passed, the operation proceeds to step S108, and when the result is "NO", which means that a predetermined period has not passed, the operation proceeds to step S116.

In step S108, a predetermined value #TMALCS2 is set in a solenoid OFF delay timer TALCSDL2 for the spool valve 71, then the operation proceeds to step S109. This procedure is performed in order to ensure a certain period of time has passed from completion of the determination in step S105 to completion of the OFF operation of the solenoid for the spool valve 71 in step S116, which will be explained below, when the engine operation is alternated from the cylinder deactivation operation to normal operation.

In step S109, the flag F_ALCSSOL of the solenoid for the cylinder deactivation operation is set to "1", i.e., the solenoid for the cylinder deactivation operation in the spool valve 71 is set to be ON, then the operation proceeds to step S110.

In step S110, it is determined by the POIL sensor S5 whether hydraulic pressure is actually produced after the solenoid for the cylinder deactivation operation was set to be ON. Specifically, it is determined whether or not engine oil pressure POIL is equal to or greater than cylinder deactivation permissible oil pressure #POILCSH (e.g., 137 kPa (=1.4 kg/cm$^2$)). When the result of the determination in step S110 is "YES", which means that engine oil pressure POIL is at the high pressure side, the operation proceeds to step S111, and when the result is "NO" (there is hysteresis), the operation proceeds to step S118. An oil pressure switch may be provided for the determination instead of the POIL sensor S5.

In step S111, it is determined whether the value of a cylinder deactivation execution delay timer TCSDLY1 is "0" in order to ensure a certain period of time has passed from when the spool valve 71 is switched on to when oil pressure is produced. When the result of the determination in step S111 is "YES", the operation proceeds to step S112, and when the result is "NO", the operation proceeds to step S120A.

In step S112, a timer value #TMNCSDL2, which is retrieved from a table depending on the engine running speed NE, is set in a cylinder deactivation cancellation delay timer TCSDLY2. The reason for setting the timer value #TMNCSDL2 depending on the engine running speed NE is that the oil pressure response changes depending on the engine running speed NE. Therefore, the lower the engine running speed NE is, the greater the timer value #TMNCSDL2 is.

In step S113, the cylinder deactivation executing flag F_ALCS is set to "1", and the control operation of this flow is terminated.

In step S114, it is determined whether the value of the solenoid OFF delay timer TALCSDL2 is "0". When the result of the determination in step S114 is "YES", which means that a predetermined period has passed, the operation proceeds to step S115, and when the result is "NO", which means that a predetermined period has not passed, the operation proceeds to step S109.

In step S115, a predetermined value #TMALCS 1 is set in the solenoid ON delay timer TALCSDL1 for the spool valve 71, then the operation proceeds to step S116. This procedure is performed in order to ensure a certain period of time has passed from completion of the determination in step S105 to an ON operation of the solenoid for the spool valve 71 in step S109 when the engine operation is alternated from the cylinder deactivation operation to normal operation.

In step S116, the flag F_ALCSSOL of the solenoid for the cylinder deactivation operation is set to "0", i.e., the solenoid for the cylinder deactivation operation in the spool valve 71 is set to be OFF, then the operation proceeds to step S117.

In step S117, it is determined by the POIL sensor S5 whether hydraulic pressure is actually reduced after the solenoid for the cylinder deactivation operation was set to be OFF. Specifically, it is determined whether or not engine oil pressure POIL is equal to or less than cylinder deactivation cancellation oil pressure #POILCSL (e.g., 98 kPa (=1.0 kg/cm$^2$)). When the result of the determination in step S117 is "YES", which means that engine oil pressure POIL is at the low pressure side, the operation proceeds to step S118, and when the result is "NO" (there is hysteresis), the operation proceeds to step S111. An oil pressure switch may be provided for the determination instead of the POIL sensor S5.

In step S118, it is determined whether the value of the cylinder deactivation cancellation delay timer TCSDLY2 is "0" in order to ensure a certain period of time has passed from when the spool valve 71 is switched off to when oil pressure is reduced. When the result of the determination in step S118 is "YES", the operation proceeds to step S119, and when the result is "NO", the operation proceeds to step S113.

In step S119, a timer value #TMNCSDL1, which is retrieved from a table depending on an engine running speed NE, is set in the cylinder deactivation execution delay timer TCSDLY1, then the operation proceeds to step S120A. The reason for setting the timer value #TMNCSDL1 depending on the engine running speed NE is that the oil pressure response changes depending on the engine running speed NE. Therefore, the lower the engine running speed NE is, the greater the timer value #TMNCSDL1 is.

In step S120A, a timer value #TMCSCEND (e.g., 30 seconds) is set in a cylinder deactivation compulsory cancellation timer TCSCEND, then the operation proceeds to step S120. The cylinder deactivation compulsory cancellation timer TCSCEND is provided to compulsorily cancel the cylinder deactivation operation when a predetermined period has passed since the beginning of the cylinder deactivation operation.

In step S120, the cylinder deactivation executing flag F_ALCS is set to "0", and the control operation of this flow is terminated.

Operation for Determining Whether the Pre-Deactivation Conditions Permitting the Cylinder Deactivation Operation are Satisfied Next, the operation for determining whether the pre-deactivation conditions permitting the cylinder deactivation operation are satisfied in step S103 shown in FIG. 2 will be explained with reference to FIG. 3. This operation will be repeated at a predetermined period.

In step S131, it is determined whether ambient temperature TA is within a predetermined range, i.e., whether the ambient temperature TA satisfies the following inequality:

lowest permissible ambient temperature for cylinder deactivation #TAALCSL (e.g. 0° C.) ≦TA≦highest permissible ambient temperature for cylinder deactivation #TAALCSH (e.g., 50° C.). When it is determined, in step S131, that the ambient temperature TA is within the predetermined range, the operation proceeds to step S132. When it is determined that the ambient temperature TA is out of the predetermined range, the operation proceeds to step S144. This procedure is provided because the cylinder deactivation operation may make the engine unstable when ambient temperature TA is below the lowest permissible ambient temperature for cylinder deactivation #TAALCSL or when the ambient temperature TA is above the highest permissible ambient temperature for cylinder deactivation #TAALCSH.

In step S132, it is determined whether cooling water temperature TW is within a predetermined range, i.e., whether cooling water temperature TW satisfies the following inequality:

lowest permissible cooling water temperature for cylinder deactivation #TWALCSL (e.g., 70° C.)≦TA≦highest permissible cooling water temperature for cylinder deactivation #TWALCSH (e.g., 100° C.). When it is determined, in step S132, that the cooling water temperature TW is within the predetermined range, the operation proceeds to step S133. When it is determined that the cooling water temperature TW is out of the predetermined range, the operation proceeds to step S144. This procedure is provided because the cylinder deactivation operation may make the engine unstable when cooling water temperature TW is below the lowest permissible cooling water temperature for cylinder deactivation #TWALCSL or when the cooling water temperature TW is above the highest permissible cooling water temperature for cylinder deactivation #TWALCSH.

In step S133, it is determined whether ambient pressure PA is equal to or greater than a lowest permissible ambient pressure for cylinder deactivation #PAALCS (e.g., 77.3 kPa (=580 mmHg)). When the result of the determination in step S133 is "YES", which means that the ambient pressure PA is equal to or greater than the lowest permissible ambient pressure #PAALCS, the operation proceeds to step S134, and when the result is "NO", the operation proceeds to step S144. This procedure is provided because it is undesirable to execute the cylinder deactivation operation when the ambient pressure is relatively low. For example, when the cylinder deactivation operation is executed under such a condition, negative pressure in the master vac for the brake system may not be ensured to be sufficient for the braking operation.

In step S134, it is determined whether voltage VB of the 12-volt auxiliary battery 4 (power supply voltage) is equal to or greater than a lowest permissible voltage for cylinder deactivation #VBALCS (e.g., 10.5 V). When the result of the determination in step S134 is "YES", which means that the voltage VB is equal to or greater than the lowest permissible voltage #VBALCS, the operation proceeds to step S135, and when the result is "NO", the operation proceeds to step S144. This procedure is provided because the response of the spool valve 71 is degraded when the voltage VB of the 12-volt auxiliary battery 4 is relatively low. In addition, this procedure is provided in order to protect the auxiliary battery 4 when the voltage thereof is decreased under a low ambient temperature or when the auxiliary battery 4 is deteriorated.

In step S135, it is determined whether battery temperature TBAT of the battery 3 is equal to or lower than a highest permissible battery temperature for cylinder deactivation #TBALCSH (e.g., 40° C.). When the result of the determination in step S135 is "YES", the operation proceeds to step S136, and when the result is "NO", the operation proceeds to step S144.

In step S136, it is determined whether the battery temperature TBAT of the battery 3 is equal to or greater than a lowest permissible battery temperature for cylinder deactivation #TBALCSL (e.g., 10° C.). When the result of the determination in step S136 is "YES", the operation proceeds to step S137, and when the result is "NO", the operation proceeds to step S144. Steps 135 and 136 are provided because it is undesirable to execute the cylinder deactivation operation when the temperature of the battery 3 is out of the predetermined range.

In step S137, it is determined whether a fuel cut-off during deceleration is being executed according to whether a fuel cut-offflag F_FC is "1". When the result of the determination in step S137 is "YES", the operation proceeds to step S138, and when the result is "NO", the operation proceeds to step S144. This procedure is provided because the fuel supply must be stopped prior to execution of the cylinder deactivation operation.

In step S138, it is determined whether oil temperature TOIL is within a predetermined range, i.e., whether oil temperature the TOIL satisfies the following inequality:

lowest permissible oil temperature for cylinder deactivation #TOALCSL (e.g., 70° C.)≦TOIL≦highest permissible oil temperature for cylinder deactivation #TOALCSH (e.g., 100° C.). When it is determined, in step S138, that the oil temperature TOIL is within the predetermined range, the operation proceeds to step S139. When it is determined that oil temperature TOIL is out of the predetermined range, the operation proceeds to step S144. This procedure is provided because the response in alternation between normal operation and the cylinder deactivation operation of the engine may be unstable if the cylinder deactivation operation is executed when the oil temperature TOIL is below the lowest permissible oil temperature for cylinder deactivation #TOALCSL or when the oil temperature TOIL is above the highest permissible oil temperature for cylinder deactivation #TOALCSH.

Figure 3:
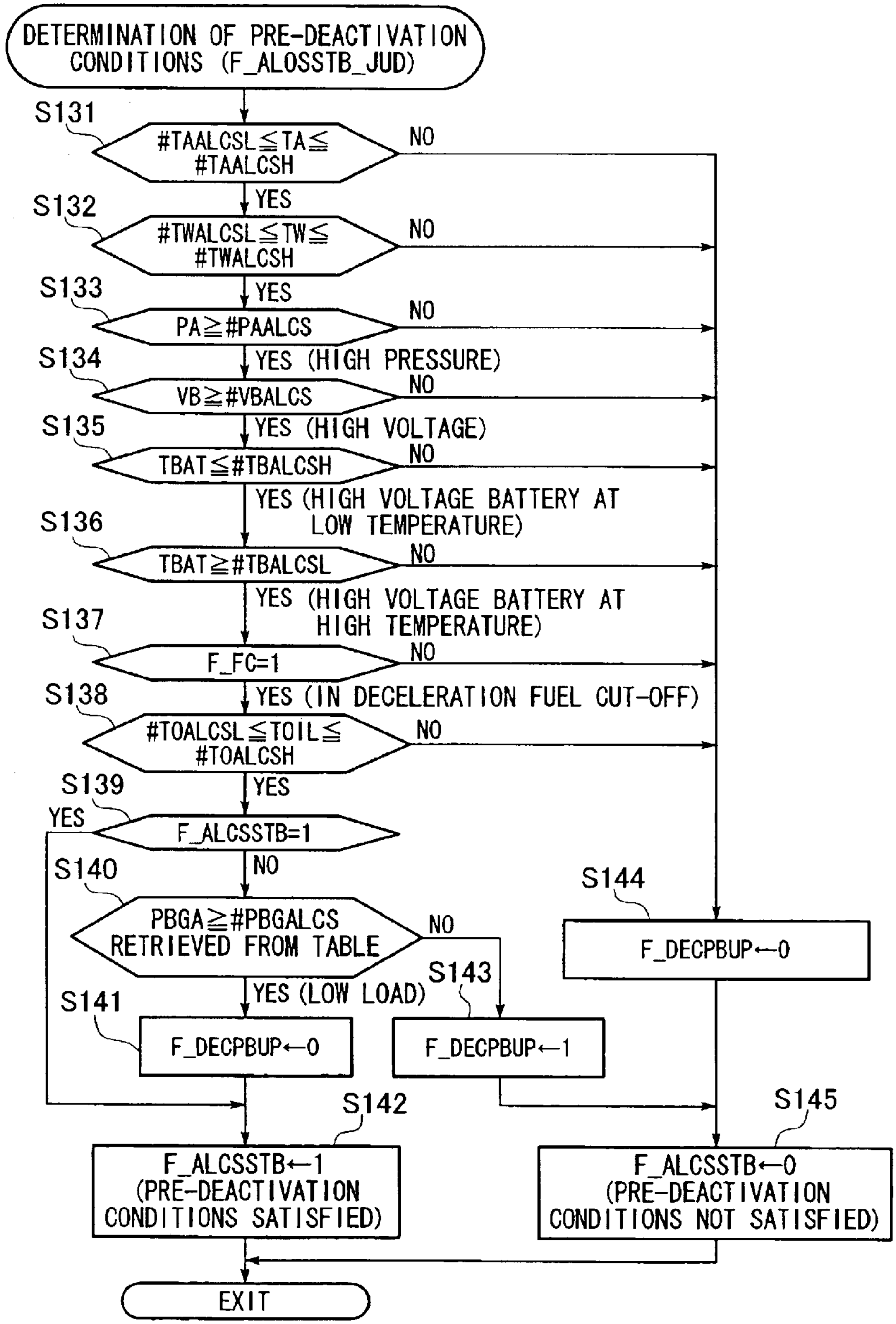
FIG. 3 is a flowchart showing the operation for determining whether the pre-deactivation conditions permitting the cylinder deactivation operation are satisfied in an embodiment of the present invention.

In step S139, it is determined whether the value of the cylinder deactivation stand-by flag F_ALCSSTB is "1", which is set through the operation shown in FIG. 3. When the result of the determination in step S139 is "YES", the operation proceeds to step S142, and when the result is "NO", the operation proceeds to step S140.

In step S140, it is determined whether intake negative pressure PBGA in the intake passage, i.e., intake air pressure, is higher (i.e., closer to atmospheric pressure) than a permissible negative pressure for cylinder deactivation #PBGALCS (i.e., the first predetermined threshold). The permissible negative pressure for cylinder deactivation #PBGALCS is retrieved from a table which was defined in accordance with the engine running speed NE such that the greater the engine running speed NE is, the less (closer to vacuum) the permissible negative pressure #PBGALCS is. For example, the permissible negative pressure #PBGALCS may be set to be −80 kPa (=−600 mmHg) at an engine running speed NE of 3000 rpm.

This procedure is provided in order not to immediately execute the cylinder deactivation operation, but to execute the operation after utilizing the intake negative pressure for ensuring negative pressure in the master vac when the load of the engine is considerably great, i.e., the intake negative pressure is lower (closer to vacuum) than the permissible negative pressure #PBGALCS. When the result of the determination in step S140 is "YES" (i.e., low load and small negative pressure), the operation proceeds to step S141, and when the result is "NO" (i.e., high load and large negative pressure), the operation proceeds to step S143. In step S143, a flag F_DECPBUP is set to "1", then the operation proceeds to step S145. The flag F_DECPBUP is used to close or open the secondary air passage.

In step S140, the determination may be made based on master vac negative pressure MPGA instead of the intake negative pressure PBGA. In this case, when the master vac negative pressure MPGA is lower than a permissible negative pressure for continuation of cylinder deactivation #MPALCS (i.e., the second predetermined threshold), the flag F_DECPBUP is set to "1" in step S143, then the operation proceeds to step S145. This procedure corresponds to the second embodiment of the present invention.

In step S141, the flag F_DECPBUP is set to "0", then the operation proceeds to step S142. In step S142, the cylinder deactivation stand-by flag F_ALCSSTB is set to "1" because pre-deactivation conditions are satisfied, and the control operation of this flow is terminated.

On the other hand, in step S144, the flag F_DECPBUP is set to "0", then the operation proceeds to step S145. In step S145, the cylinder deactivation stand-by flag F_ALCSSTB is set to "0" because pre-deactivation conditions are not satisfied, and the control operation of this flow is terminated.

When the value of the flag F_DECPBUP is "1", the secondary air passage 33 is closed under a certain condition, and when the value of the flag F_DECPBUP is "0", the secondary air passage 33 is opened under a certain condition.

In other words, when it is determined that the engine is under a high load condition, the secondary air passage 33 is closed (step S143), the cylinder deactivation operation is not started (step S145), and the control operation is restarted from step S131. When it is determined, in step S140, that the intake negative pressure PBGA becomes a predetermined value, the control operation is triggered to proceed to steps S141 and S142, then the pre-deactivation conditions are deemed to be satisfied, i.e., the cylinder deactivation stand-by flag F_ALCSSTB is set to "1".

Accordingly, the cylinder deactivation operation is executed after ensuring negative pressure in the master vac to be sufficient by closing the secondary air passage 33 at the beginning of deceleration traveling. Because pressure in the master vac is sufficiently low, the braking force is sufficiently assisted even when negative pressure in the master vac is reduced by the braking operation. Furthermore, fuel consumption is greatly improved because the cylinder deactivation operation is less frequently cancelled and regenerative energy is fully utilized.

Figure 2:
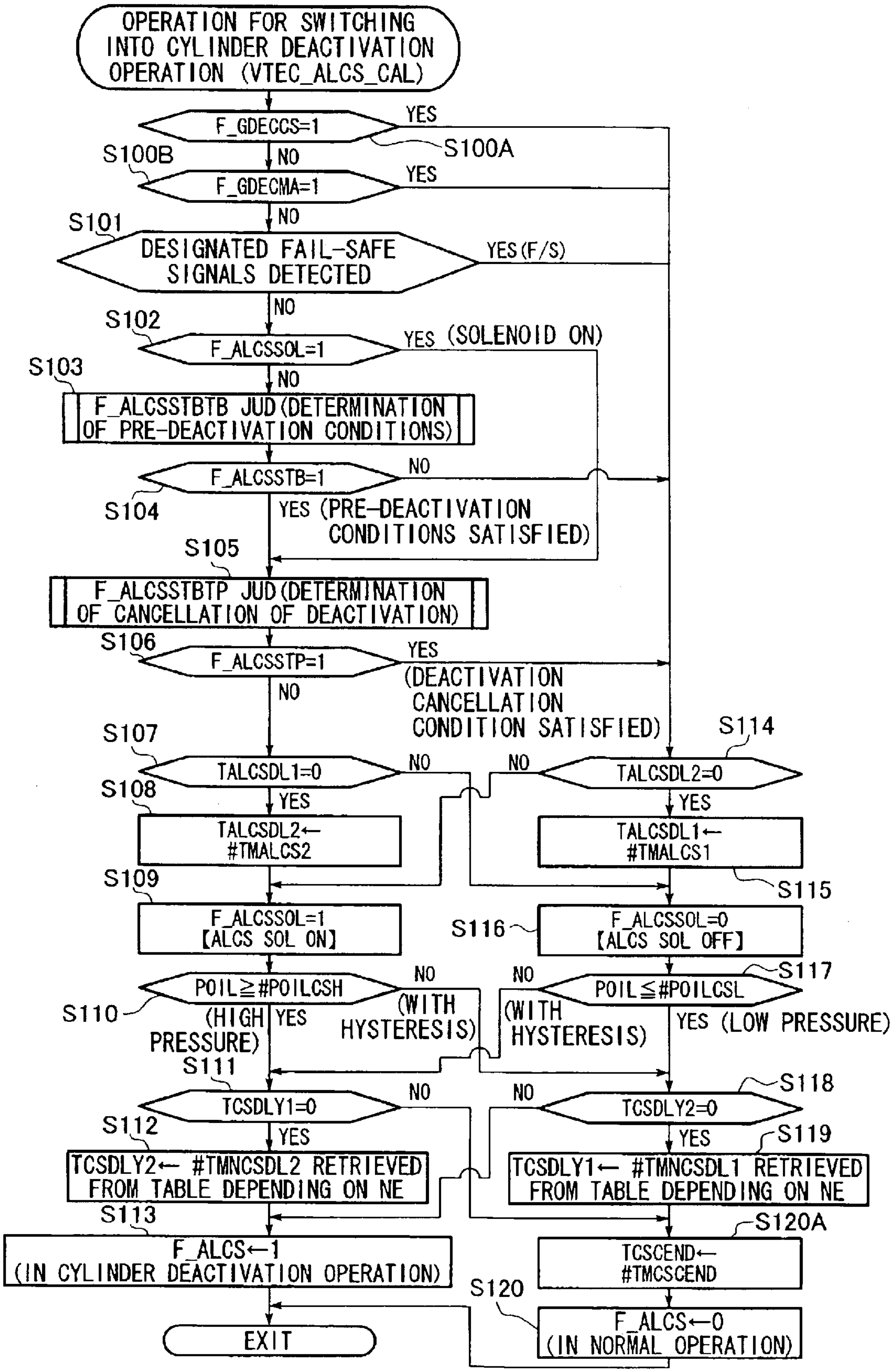
FIG. 2 is a flowchart showing the operation for switching into a cylinder deactivation operation in an embodiment of the present invention.
Figure 4:
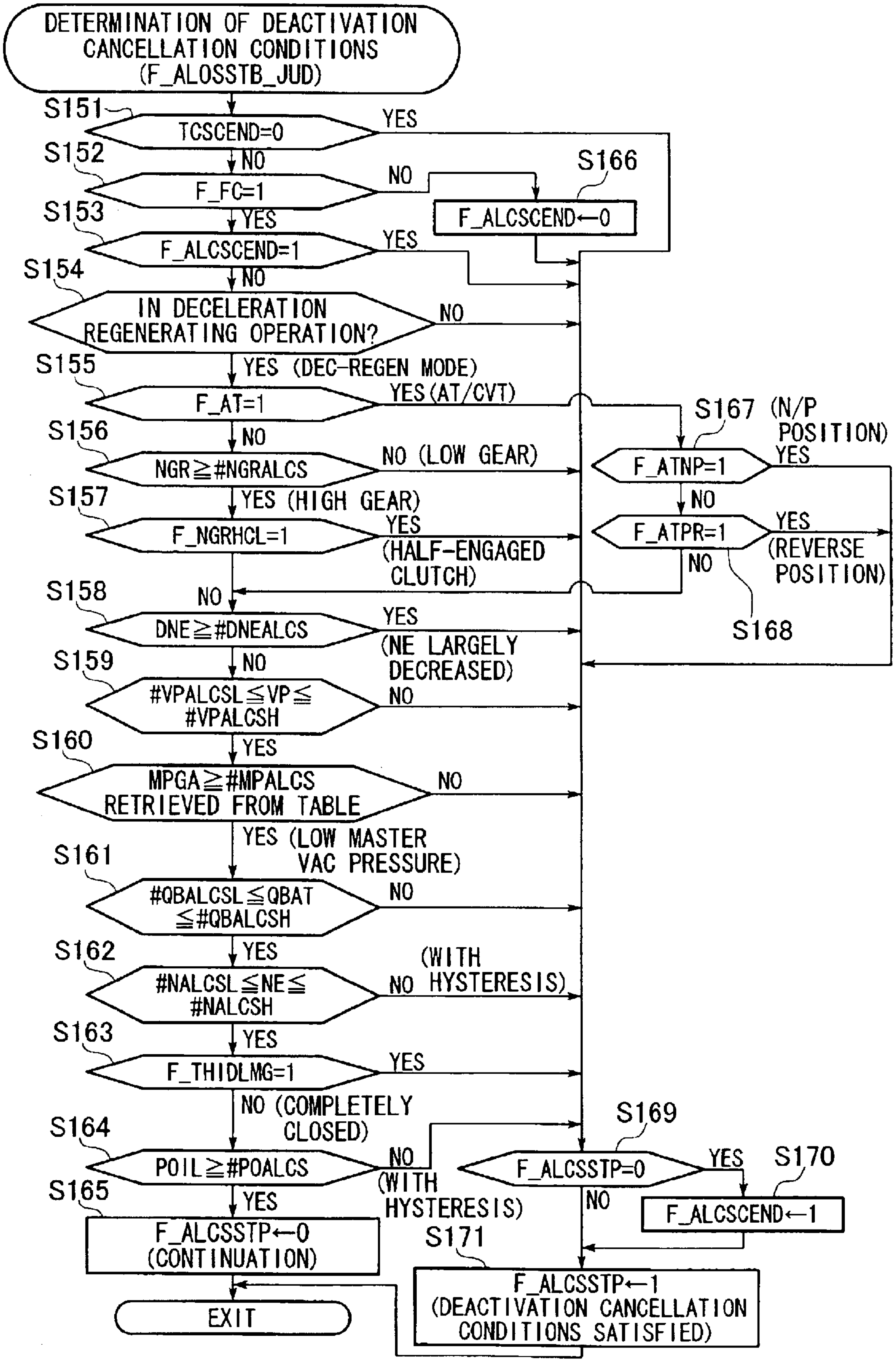
FIG. 4 is a flowchart showing the operation for determining whether the deactivation cancellation conditions are satisfied in an embodiment of the present invention.

Operation for Determining Whether the Deactivation Cancellation Conditions are Satisfied Next, the operation for determining whether the deactivation cancellation conditions shown in step S105 in FIG. 2 are satisfied will be explained with reference to FIG. 4. This operation will be repeated at a predetermined period.

In step S151, it is determined whether the value of the cylinder deactivation compulsory cancellation timer TCSCEND is "0". When the result of the determination in step S151 is "YES", the operation proceeds to step S169, and when the result is "NO", the operation proceeds to step S152, because the cylinder deactivation operation should be cancelled when the value of the cylinder deactivation compulsory cancellation timer TCSCEND is "0".

In step S152, it is determined whether the value of the fuel cut-offflag F_FC is "1". When the result of the determination in step S152 is "YES", the operation proceeds to step S153, and when the result is "NO", the operation proceeds to step S166. This procedure is provided because the purpose of the cylinder deactivation operation is to further obtain regenerative energy equivalent to the reduction in engine friction resulting when the fuel supply is stopped during deceleration traveling.

In step S166, a cylinder deactivation ending flag F_ALCSEND is set to "0", then the operation proceeds to step S169.

In step S153, it is determined whether the value of the cylinder deactivation ending flag F_ALCSEND is "1". When the result of the determination in step S153 is "YES", the operation proceeds to step S169, and when the result is "NO", the operation proceeds to step S154.

In step S154, it is determined whether deceleration regeneration is being performed. When the result of the determination in step S154 is "YES", the operation proceeds to step S155, and when the result is "NO", the operation proceeds to step S169.

In step S155, it is determined whether the value of an MT/CVT indication flag F_AT is "1". When the result of the determination in step S155 is "NO", which means that the present vehicle employs an MT (manual transmission), the operation proceeds to step S156, and when the result is "YES", which means that the present vehicle employs an AT (automatic transmission) or a CVT, the operation proceeds to step S167.

In step S167, it is determined whether the value of an in-gear indication flag F_ATNP is "1". When the result of the determination in step S167 is "NO", which means that the vehicle is in driving mode, the operation proceeds to step S168, and when the result is "YES", which means that the transmission is in N (neutral) or P (parking) position, the operation proceeds to step S169.

In step S168, it is determined whether the value of a reverse position indication flag F_ATPR is "1". When the result of the determination in step S168 is "YES", which means that the transmission is in reverse position, the operation proceeds to step S169, and when the result is "NO", which means that the transmission is in a position other than the reverse position, the operation proceeds to step S158.

Through the procedures in steps S167 and S168, the cylinder deactivation operation is cancelled in N/P or reverse position.

In step S156, it is determined whether the previous gear position NGR is equal to or higher than a lowest permissible gear position for cylinder deactivation #NGRALCS (e.g., third gear). When the result of the determination in step S156 is "YES", i.e., higher gear position, the operation proceeds to step S157, and when the result is "NO", i.e., lower gear position, the operation proceeds to step S169. This procedure is provided because the regeneration efficiency is reduced in low gear positions, and to avoid a frequent alternation into the cylinder deactivation operation when the vehicle is in a traffic jam.

In step S157, it is determined whether the value of a half-engaged clutch indication flag F_NGRHCL is "1". When the result of the determination in step S157 is "YES", which indicates a half-engaged clutch state, the operation proceeds to step S169, and when the result is "NO", the operation proceeds to step S158. By providing this procedure, it is possible to avoid undesirable cylinder deactivation operations which may cause an engine stall when the clutch is placed in a half-engaged state to stop the vehicle, or an insufficient acceleration performance the clutch is placed in a half-engaged state for gear position shifting to accelerate the vehicle.

In step S158, it is determined whether an engine revolution decrease amount DNE is equal to or greater than a highest permissible engine revolution decrease amount for cylinder deactivation #DNEALCS (e.g., 100 rpm). When the result of the determination in step S158 is "YES", which means that the engine revolution is considerably decreased, the operation proceeds to step S169, and when the result is "NO", the operation proceeds to step S159. This procedure is provided to avoid undesirable cylinder deactivation operations which may cause an engine stall when the engine revolution is rapidly decreasing.

In step S159, it is determined whether a vehicle speed VP is within a predetermined range, i.e., whether the vehicle speed VP satisfies the following inequality:

lowest permissible vehicle speed for continuation of cylinder deactivation #VPALCSL (e.g., 10 km/h)≦VP≦highest permissible vehicle speed for continuation of cylinder deactivation #VPALCSH (e.g., 60 km/h). When it is determined, in step S159, that the vehicle speed VP is within the predetermined range, the operation proceeds to step S160. When it is determined that the vehicle speed VP is out of the predetermined range, the operation proceeds to step S169. Accordingly, the cylinder deactivation operation is cancelled when the vehicle speed VP is below the lowest permissible vehicle speed for cylinder deactivation continuation #VPALCSL or when the vehicle speed VP is above the highest permissible vehicle speed for cylinder deactivation continuation #VPALCSH.

In step S160, it is determined whether the master vac negative pressure MPGA is equal to or lower than (closer to vacuum) the permissible negative pressure for continuation of cylinder deactivation #MPALCS (i.e., the second predetermined threshold). The permissible negative pressure for continuation of cylinder deactivation #MPALCS is retrieved from a table which was defined depending on the vehicle speeds VP such that the greater the vehicle speed VP is, the lower (closer to vacuum) the permissible negative pressure #MPALCS is. The permissible negative pressure #MPALCS is preferably determined in accordance with the kinetic energy of the vehicle, i.e., the vehicle speed due to the use of the master vac negative pressure MPGA to stop the vehicle. For example, the permissible negative pressure #MPALCS may be set to be −60 kPa (=450 mmHg) at a vehicle speed VP of 40 km/h.

In step S160, when the master vac negative pressure MPGA is lower than the permissible negative pressure for continuation of cylinder deactivation #MPALCS, which means that the master vac negative pressure MPGA is closer to vacuum, the operation proceeds to step S161. When the master vac negative pressure MPGA is higher than the permissible negative pressure for continuation of cylinder deactivation #MPALCS, which means that the master vac negative pressure MPGA is closer to atmospheric pressure, the operation proceeds to step S169. This procedure is provided because it is undesirable to continue the cylinder deactivation operation when the master vac negative pressure MPGA is not sufficiently low.

In step S161, it is determined whether a remaining battery charge QBAT is within a predetermined range, i.e., whether the remaining battery charge QBAT satisfies the following inequality:

lowest permissible remaining battery charge for continuation of cylinder deactivation #QBALCSL (e.g., 30%) ≦QBAT≦highest permissible remaining battery charge for continuation of cylinder deactivation #QBALCSH (e.g., 80%). When it is determined, in step S161, that the remaining battery charge QBAT is within the predetermined range, the operation proceeds to step S162. When it is determined that the remaining battery charge QBAT is out of the predetermined range, the operation proceeds to step S1169. Accordingly, the cylinder deactivation operation is cancelled when the remaining battery charge QBAT is below the lowest permissible remaining battery charge for cylinder deactivation continuation #QBALCSL or when the remaining battery charge QBAT is above the highest permissible remaining battery charge for cylinder deactivation continuation #QBALCSH. This procedure is provided because electric energy supplied to the motor M for assisting the engine driving cannot be ensured when the remaining battery charge QBAT is too low, and because regenerative energy cannot be drawn when the remaining battery charge QBAT is too high.

In step S162, it is determined whether the engine running speed NE is within a predetermined range, i.e., whether the engine running speed NE satisfies the following inequality:

lowest permissible engine running speed for continuation of cylinder deactivation #NALCSL (e.g., 800 rpm) ≦NE≦highest permissible engine running speed for continuation of cylinder deactivation #NALCSH (e.g., 3000 rpm). When it is determined, in step S162, that the engine running speed NE is within the predetermined range, the operation proceeds to step S163. When it is determined that the engine running speed NE is out of the predetermined range, the operation proceeds to step S169. Accordingly, the cylinder deactivation operation is cancelled when the engine running speed NE is below the lowest permissible engine running speed for cylinder deactivation continuation #NALCSL or when the engine running speed is above the highest permissible engine running speed for cylinder deactivation continuation #NALCSH. This procedure is provided because the regenerative efficiency may be low or hydraulic pressure for alternating into the cylinder deactivation operation may not be ensured when the engine running speed NE is too low, and because the operation oil for executing a cylinder deactivation operation may be excessively consumed when the engine running speed NE is too high.

In step S163, it is determined whether the value of an idling indication flag F_THIDLMG is "1". When the result of the determination in step S162 is "YES", which means that the throttle of the engine is not completely closed, the operation proceeds to step S169, and when the result is "NO", which means that the throttle of the engine is completely closed, the operation proceeds to step S164. This procedure is provided to cancel the cylinder deactivation operation even when the throttle is slightly opened from a completely closed state so that marketability of the vehicle is enhanced.

In step S164, it is determined whether the engine oil pressure POIL is equal to or greater than a lowest permissible oil pressure for continuation of cylinder deactivation #POALCS (e.g., with a hysteresis range from 98 to 137 kPa (from 1.0 to 1.4 $kg/cm^2$)). When the result of the determination in step S162 is "YES", the operation proceeds to step S165, and when the result is "NO", the operation proceeds to step S169. This procedure is provided because hydraulic pressure for executing the cylinder deactivation operation (e.g., hydraulic pressure for operating the spool valve 71) cannot be ensured when the engine oil pressure POIL is less than the lowest permissible oil pressure for continuation of cylinder deactivation #POALCS.

In step S165, the conditions for canceling the cylinder deactivation operation are not satisfied; therefore, the deactivation cancellation flag F_ALCSSTP is set to "0" so as to continue the cylinder deactivation operation, and the control operation of this flow is terminated.

In step S169, it is determined whether the value of the deactivation cancellation flag F_ALCSSTP indicating the result of the operation in this flowchart is "0". When the result of the determination in step S169 is "YES", the operation proceeds to step S170, and when the result is "NO", the operation proceeds to step S171.

In step S170, the cylinder deactivation ending flag F_ALCSEND is set to "1", then the operation proceeds to step S171. In step S171, the conditions for canceling the cylinder deactivation operation are satisfied; therefore, the deactivation cancellation flag F_ALCSSTP is set to "1", and the control operation of this flow is terminated.

The cylinder deactivation ending flag F_ALCSEND is provided so as not to cancel the cylinder deactivation operation unless deceleration fuel cut-off is ended and the engine returns to a normal operation state, i.e., to avoid hunting in control.

Operation for Selecting Air Control Mode

Figure 5:
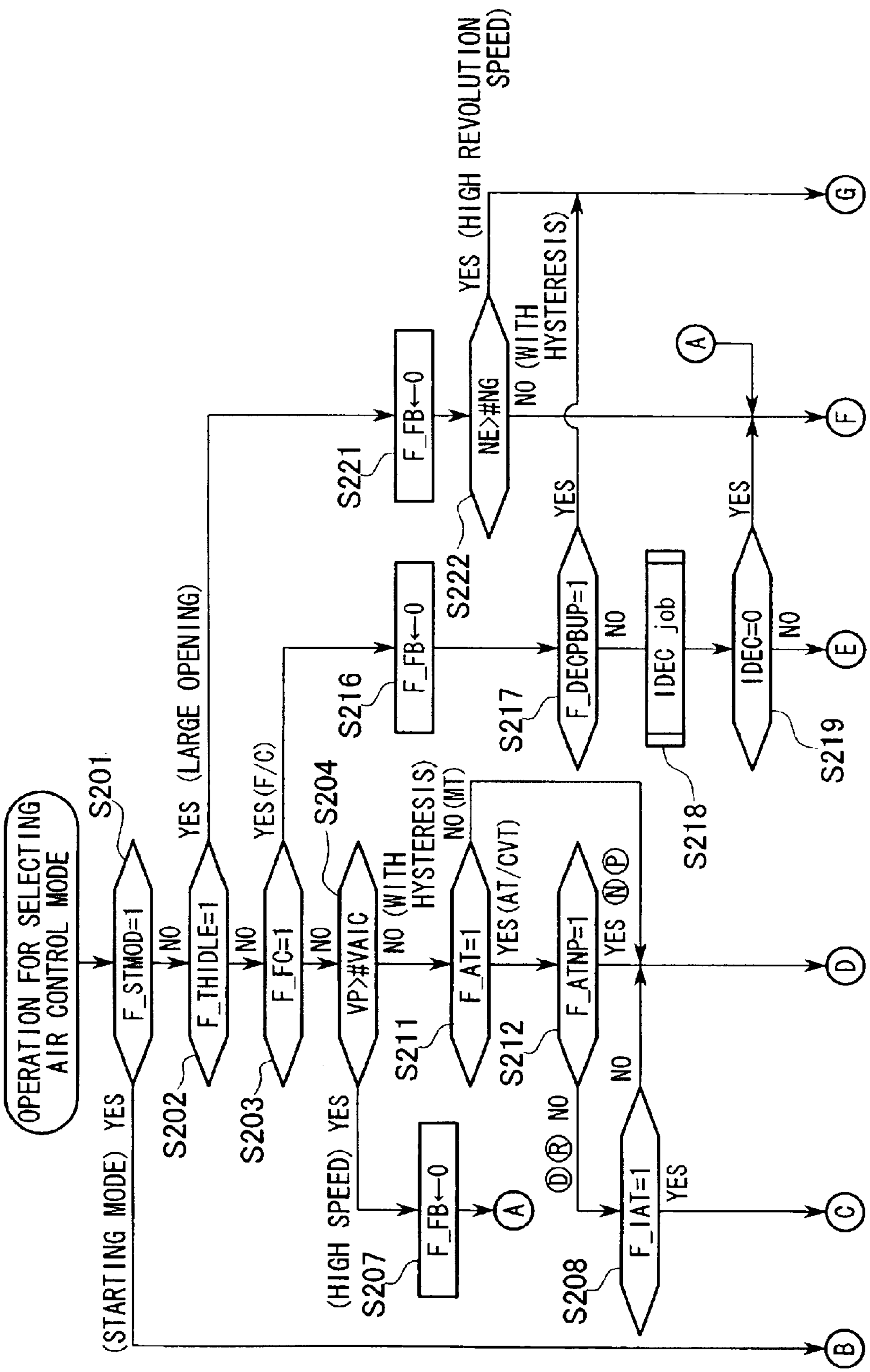
FIG. 5 is a flowchart showing the operation for selecting air control mode in an embodiment of the present invention.
Figure 6:
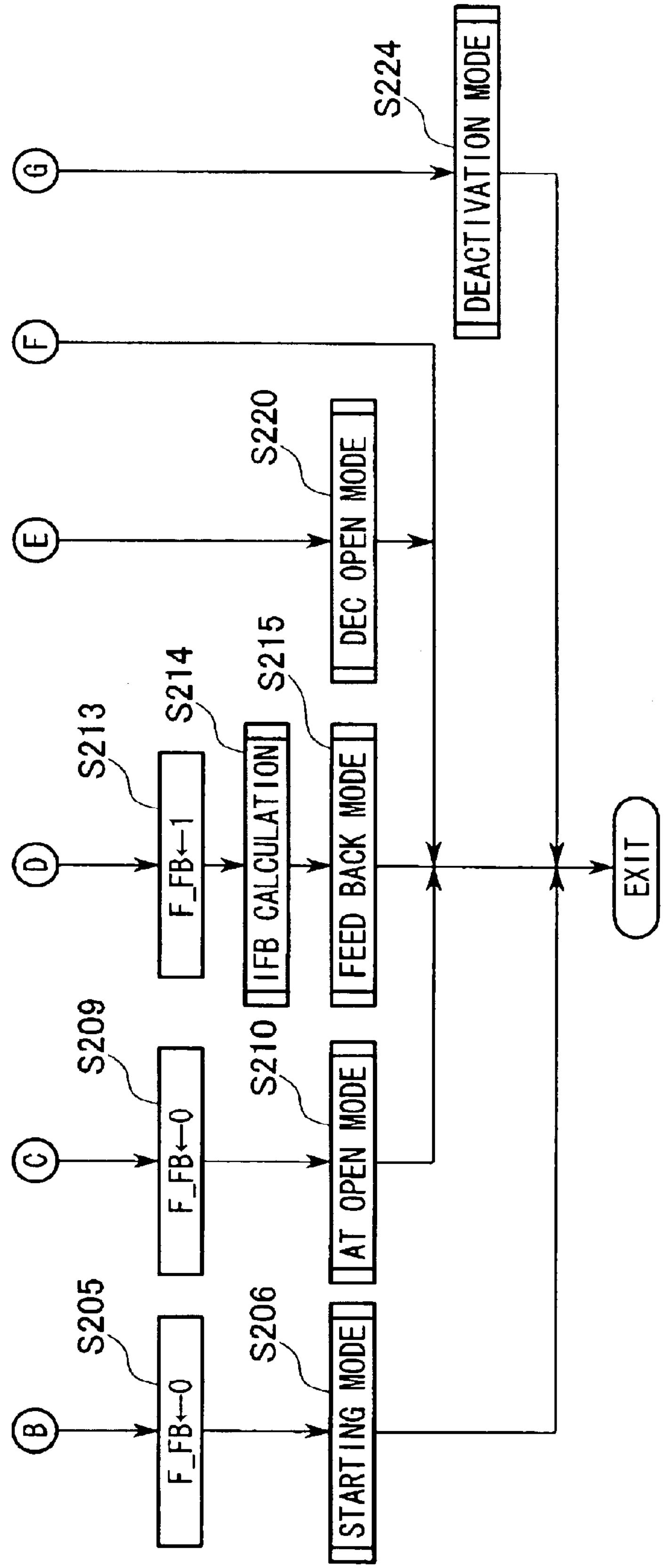
FIG. 6 is also a flowchart showing the operation for selecting air control mode in an embodiment of the present invention.

Next, the operation for selecting air control mode will be explained with reference to FIGS. 5 and 6. The purpose of this control operation is to appropriately open/close the control valve 34 of the secondary air passage 33 in accordance with the engine running state. This operation will be repeated at a predetermined period.

In step S201, it is determined whether the engine is in starting mode according to whether the value of a starting mode flag F_STMOD is "1". When the result of the determination in step S201 is "YES", the operation proceeds to step S205, and when the result is "NO", the operation proceeds to step S202.

In step S205, a feedback flag F_FB is set to "0", and in step S206, the engine operation state is deemed to be in starting mode in which a certain amount of air is ensured, then, the control operation of this flow is terminated. When the feedback flag F_FB is "0", the opening degree of the control valve 34 is not controlled in a feedback manner.

In step S202, it is determined whether the throttle is in a widely opened state according to whether the value of a throttle opening flag F_THIDLE is "1". When the result of the determination in step S202 is "YES", which means that the throttle is in a widely opened state, the operation proceeds to step S221, and when the result is "NO", the operation proceeds to step S203.

In step S203, it is determined whether the value of the fuel cut-off flag F_FC is "1". When the result of the determination in step S203 is "YES", the operation proceeds to step S216, and when the result is "NO", the operation proceeds to step S204.

In step S204, it is determined whether the vehicle speed VP is greater than a predetermined threshold #VAIC. When the result of the determination in step S204 is "YES", which means that the vehicle is traveling at a high speed, the operation proceeds to step S207, and when the result is "NO", the operation proceeds to step S211. In step S207, the feedback flag F_FB is set to "0", and the control operation of this flow is terminated.

In step S211, it is determined whether the value of the MT/CVT indication flag F_AT is "1". When the result of the determination in step S211 is "NO", which means that the present vehicle employs an MT (manual transmission), the operation proceeds to step S213, and when the result is "YES", which means that the present vehicle employs an AT (automatic transmission) or a CVT, the operation proceeds to step S212.

In step S212, it is determined whether the value of the in-gear indication flag F_ATNP is "1". When the result of the determination in step S212 is "NO", which means that the vehicle is in driving mode, the operation proceeds to step S208, and when the result is "YES", which means that the transmission is in N (neutral) or P (parking) position, the operation proceeds to step S213.

In step S208, it is determined whether the value of a flag F_IAT is "1". The flag FIAT is provided to indicate that feedback of number of engine revolution at idling is prohibited during an in-gear state. When the result of the determination in step S208 is "YES", which means that the engine is in in-gear open loop control mode for idling, the operation proceeds to step S209, and when the result is "NO", the operation proceeds to step S213. In step S209, the feedback flag F_FB is set to "0", and in step S210, the engine operation state is deemed to be in "AT OPEN" mode in which a certain amount of air is ensured to maintain creeping, then, the control operation of this flow is terminated.

In step S213, the feedback flag F_FB is set to "1", in step S214, a feedback amount IFB is calculated, and in step S215, the engine operation state is deemed to be in "FEEDBACK" mode, then, the control operation of this flow is terminated.

In step S216, the feedback flag F_FB is set to "0", and in step S217, it is determined whether the value of the flag F_DECPBUP is "1". The flag F_DECPBUP is set or reset in steps S143 and S141 as shown in FIG. 3. When the result of the determination in step S217 is "YES", the operation proceeds to step S224, and when the result is "NO", the operation proceeds to step S218. The control valve 34 is closed (corresponding to step S224 in FIG. 6) when the cylinder deactivation operation is not allowed (corresponding to steps S143 and S145, and step S217 in FIG. 5).

In step S218, a secondary air correction amount during deceleration IDEC is calculated, then, the operation proceeds to step S219.

In step S219, it is determined whether the secondary air correction amount IDEC is "0". When the result of the determination in step S219 is "YES", which means that there is no correction amount (i.e., IDEC=0), the control operation of this flow is terminated, and when the result is "NO", which means that there is some correction amount (i.e., IDEC≠0), the operation proceeds to step S220.

In step S221, the feedback flag F_FB is set to "0". In step S222, it is determined whether the engine revolution speed NE is greater than a threshold #NE which is used for the determination of entering into a deactivation mode. When the result of the determination in step S222 is "YES", which means that the engine revolution speed is relatively high, the operation proceeds to step S224, and when the result is "NO", which means that the engine revolution speed is relatively low, the control operation of this flow is terminated. In step S224, because pressure in the intake passage becomes closer to atmospheric pressure, the engine is controlled to enter into a deactivation mode in which the control valve 34 is closed so that negative pressure is generated in the intake passage, then, the control operation of this flow is terminated.

Accordingly, in this embodiment, it is included in the control operation that the operator of the vehicle intends to stop the vehicle when the vehicle experiences deceleration by a braking operation of the operator and the degree of deceleration is greater than 0.3 G ($0.3\times9.8$ m/s$^2$), the vehicle can quickly stop in accordance with the operator's desire without entering into the cylinder deactivation operation.

On the other hand, when the vehicle is moderately decelerating, the determination of a cylinder deactivation, i.e., the operation for determining whether the pre-deactivation conditions permitting the cylinder deactivation operation are satisfied, as shown in FIG. 2, is performed. In this process, when the intake negative pressure PBGA in the intake passage is lower (i.e., closer to vacuum) than the permissible negative pressure for cylinder deactivation #PBGALCS, the secondary air passage 33 is prepared to be closed (step S143 shown in FIG. 3) in order to efficiently utilize negative pressure in the intake passage for ensuring negative pressure in the master vac, and the cylinder deactivation operation is not executed (step S145 shown in FIG. 3 and step S120 shown in FIG. 2).

Upon completion of preparation, the secondary air passage 33 is closed by the control valve 34. Accordingly, negative pressure in the master vac is efficiently ensured by utilizing negative pressure in the intake passage. When negative pressure in the master vac is ensured and pressure in the intake passage (intake pressure) is increased, the control operation is triggered by this intake pressure (step S140 shown in FIG. 3), the control valve 34 is closed (step S141 shown in FIG. 3), and the cylinder deactivation operation is executed (step S142 shown in FIG. 3 and step S113 shown in FIG. 2). When the cylinder deactivation operation is cancelled through the determination of whether the deactivation cancellation conditions are satisfied (shown in FIG. 4 and step S105 shown in FIG. 2), the engine enters into normal operation (step S120 shown in FIG. 2). Accordingly, negative pressure in the master vac which is influenced by the cylinder deactivation operation can be ensured so as to maintain the brake performance while enabling a great improvement in the fuel consumption of the vehicle due to the cylinder deactivation operation.

As explained above, in this embodiment, it is possible to maintain negative pressure in the master vac at low pressure side (closer to vacuum); therefore, negative pressure in the master vac is efficiently utilized for ensuring the assist force for the braking force so that the braking effort of the operator is reduced.

In addition, because the permissible negative pressure for cylinder deactivation #PBGALCS as a threshold for the intake negative pressure PBGA is set in accordance with the engine revolution speed, negative pressure in the master vac can be sufficiently ensured.

Furthermore, because the permissible negative pressure for continuation of cylinder deactivation #MPALCS as a threshold for the master vac negative pressure MPGA is set in accordance with the vehicle speed, negative pressure in the master vac can be sufficiently ensured in accordance with the vehicle speed.

Figure 7:
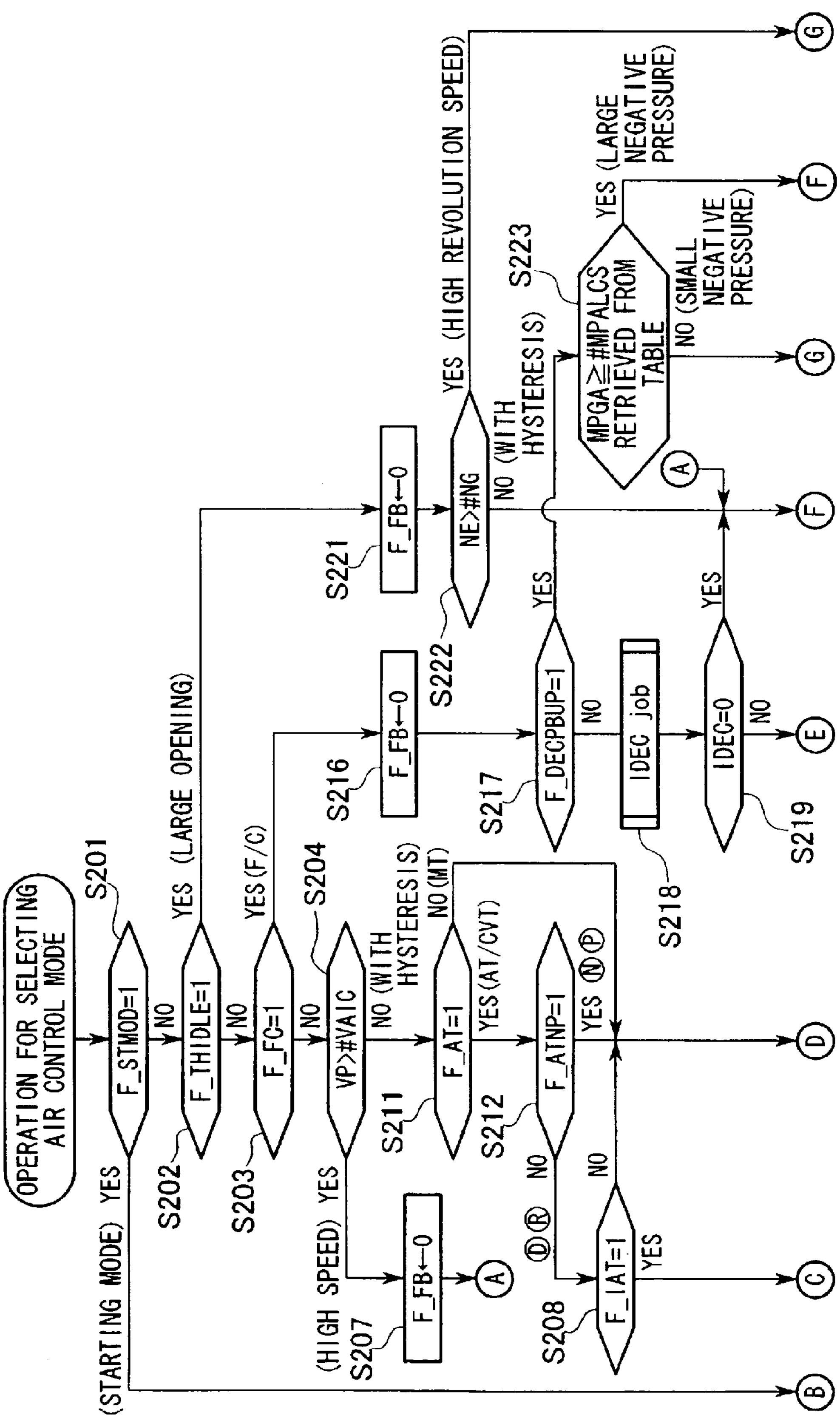
FIG. 7 is a flowchart showing the operation for selecting air control mode in another embodiment of the present invention.

FIG. 7 shows a flowchart according to another embodiment of the present invention. In this embodiment, only the flowchart of the previous embodiment shown in FIG. 5 is substituted by the flowchart shown in FIG. 7; therefore, the remaining operations will not be explained again. Because the flowchart of FIG. 7 shows the operation for selecting air control mode along with the flowchart of FIG. 6, reference will be made to FIG. 6 in the following description. In addition, because most of FIG. 7 is the same as FIG. 5, the same step numbers are assigned for the same operations, and only the differences will be explained.

This embodiment significantly differs from the previous one in that an operation for determining whether the master vac negative pressure MPGA is lower (closer to vacuum) than the permissible negative pressure for continuation of cylinder deactivation #MPALCS is included in step S223, as shown in FIG. 7.

In other words, in this embodiment, the secondary air passage 33 is closed by the control valve 34 only when the master vac negative pressure MPGA is higher (closer to atmospheric pressure) than the permissible negative pressure for continuation of cylinder deactivation #MPALCS.

Specifically, in step S217, it is determined whether the value of the flag F_DECPBUP is "1". When the result of the determination in step S217 is "YES", the operation proceeds to step S223, and when the result is "NO", the operation proceeds to step S218.

In step S222, it is determined whether the engine revolution speed NE is greater than the threshold #NE which is used for determination of entering into the deactivation mode. When the result of the determination in step S222 is "YES", which means that engine revolution speed is relatively high, the operation proceeds to step S224, and when the result is "NO", which means that the engine revolution speed is relatively low, the control operation of this flow is terminated. In step S224, the engine is controlled to enter into the deactivation mode in which the control valve 34 is closed; then, the control operation of this flow is terminated.

In step S223, it is determined whether the master vac negative Pressure MPGA is equal to or lower (closer to vacuum) than the permissible negative pressure for continuation of cylinder deactivation #MPALCS. When the master vac negative pressure MPGA is lower than the permissible negative pressure for continuation of cylinder deactivation #MPALCS, which means that the master vac negative pressure MPGA is closer to vacuum, the control operation of this flow is terminated. When the master vac negative pressure MPGA is higher than the permissible negative pressure for continuation of cylinder deactivation #MPALCS, which means that the master vac negative pressure MPGA is closer to atmospheric pressure, the operation proceeds to step S224.

Accordingly, in this embodiment, as in the above embodiment, when the vehicle is moderately decelerating, the determination of the cylinder deactivation, i.e., the operation for determining whether the pre-deactivation conditions permitting the cylinder deactivation operation are satisfied, as shown in FIG. 2, is performed. In this process, when the intake negative pressure PBGA in the intake passage is lower (i.e., closer to vacuum) than the permissible negative pressure for cylinder deactivation #PBGALCS, the secondary air passage 33 is prepared to be closed (step S143 shown in FIG. 3) in order to efficiently utilize negative pressure in the intake passage for ensuring negative pressure in the master vac, and the cylinder deactivation operation is not executed (step S145 shown in FIG. 3 and step S120 shown in FIG. 2).

Upon completion of preparation for closing the secondary air passage 33, it is determined whether the master vac negative pressure MPGA is equal to or lower (closer to vacuum) than the permissible negative pressure for continuation of cylinder deactivation #MPALCS. When the master vac negative pressure MPGA is not sufficiently low, i.e., when the result of the determination in step S223 shown in FIG. 7 is "NO", the engine is controlled to enter into the deactivation mode (step S224 shown in FIG. 6) in which the secondary air passage 33 is closed by the control valve 34. Accordingly, negative pressure in the master vac is efficiently ensured by utilizing negative pressure in the intake passage. When negative pressure in the master vac is ensured and pressure in the intake passage (intake pressure) is increased, the control operation is triggered by this intake pressure (step S140 shown in FIG. 3), the control valve 34 is closed (step S141 shown in FIG. 3), and the cylinder deactivation operation is executed (step S142 shown in FIG. 3 and step S113 shown in FIG. 2). When the cylinder deactivation operation is cancelled through the determination of whether the deactivation cancellation conditions are satisfied (shown in FIG. 4 and step S105 shown in FIG. 2), the engine enters into normal operation (step S120 shown in FIG. 2). Accordingly, negative pressure in the master vac which is influenced by the cylinder deactivation operation can be ensured so as to maintain the brake performance while enabling a great improvement in the fuel consumption of the vehicle due to the cylinder deactivation operation.

As explained above, in this embodiment, because it is directly determined whether negative pressure in the master vac is ensured, and the control valve 34 is closed when negative pressure in the master vac is not ensured (the result of the determination in step S223 shown in FIG. 7 is "NO"), in addition to the advantageous effect in the above embodiment, it is possible to operate the control valve 34 in accordance with the state of negative pressure in the master vac, and to improve reliability.

The present invention is not limited to the above embodiments. Alternatively, for example, the secondary air passage may be closed when the intake negative pressure PBGA in the intake passage is lower (i.e., closer to vacuum) than the permissible negative pressure for cylinder deactivation #PBGALCS, or when the master vac negative pressure MPGA is higher (i.e., closer to atmospheric pressure) than the permissible negative pressure for continuation of cylinder deactivation #MPALCS.

INDUSTRIAL APPLICABILITY

As explained above, according to the first aspect of the present invention, because the control valve operating section operates the secondary air valve so as to close the secondary air passage when the intake pressure is a negative value lower (closer to vacuum) than the predetermined first threshold at the instance of starting deceleration traveling, the intake depression of the engine can be efficiently utilized to ensure that the negative pressure in the master vac is sufficiently low. Accordingly, because pressure in the master vac is maintained to be sufficiently low, the braking force is sufficiently assisted even when negative pressure in the master vac is reduced by the braking operation. Furthermore, fuel consumption is greatly improved because the cylinder deactivation operation is less frequently cancelled and regenerative energy is fully utilized.

According to the second aspect of the present invention, because the control valve operating section operates the secondary air valve so as to close the secondary air passage when the negative pressure in the master vac is a negative value higher than the predetermined second threshold at the instance of starting deceleration traveling, the intake depression of the engine can be efficiently utilized to decrease the negative pressure in the master vac to a sufficiently low value. Accordingly, because pressure in the master vac is maintained to be sufficiently low, the braking force is sufficiently assisted even when negative pressure in the master vac is reduced by the braking operation. Furthermore, fuel consumption is greatly improved because the cylinder deactivation operation is less frequently cancelled and regenerative energy is fully utilized.

According to the third aspect of the present invention, because the intake depression of the engine can be efficiently utilized to decrease the negative pressure in the master vac to a sufficiently low value when the negative pressure in the master vac is not sufficiently low prior to the cylinder deactivation operation, negative pressure in the master vac which assists the braking force is ensured prior to the cylinder deactivation operation so that the braking effort of the operator is reduced.

According to the fourth aspect of the present invention, because the secondary air valve is closed so that the intake negative pressure can be ensured to be sufficiently low prior to the cylinder deactivation operation, it is possible to ensure negative pressure in the master vac prior to the cylinder deactivation operation.

According to the fifth aspect of the present invention, because the predetermined first threshold is appropriately determined in accordance with the running speed of the engine, negative pressure in the master vac can be sufficiently decreased.

According to the sixth aspect of the present invention, because the second threshold is appropriately determined in accordance with the traveling speed of the vehicle, where the second threshold relates to the negative pressure in the master vac which is utilized to decrease the traveling speed of the vehicle, negative pressure in the master vac can be sufficiently decreased in accordance with the traveling speed of the vehicle.

According to the seventh aspect of the present invention, because stopping of the vehicle may be set to have highest priority without executing the cylinder deactivation operation when the degree of deceleration is considered to be great, it is possible to prioritize the operator's desire.

Explanations of Reference Symbols

11: FIECU (control valve open/close section); 30: intake passage; 33: secondary air passage; 34: control valve (secondary air control valve); E: engine; M: motor; S1: intake negative pressure sensor (intake pressure sensing section) S3: master vac negative pressure sensor (master vac negative pressure sensing section).

What is claimed is:

1. A control device for a hybrid vehicle having an engine and a motor for outputting power for driving said vehicle, wherein a regenerative brake is used during deceleration traveling of said vehicle in accordance with a deceleration state thereof, and said engine includes at least one deactivatable cylinder which is deactivatable during deceleration traveling of said vehicle, said control device comprising:

a deactivation determining section for determining whether said deactivatable cylinder is allowed to be deactivated in accordance with a traveling state of said vehicle;

a deactivation cancellation determining section for canceling cylinder deactivation during deactivation operation;

an intake pressure sensing section for measuring air pressure in an intake passage of said engine; and a control valve operating section for opening/closing a secondary air passage of said engine for providing auxiliary air into said intake passage by operating a secondary air valve, wherein said control valve operating section operates said secondary air valve so as to close said secondary air passage when the intake pressure measured by said intake pressure sensing section is a negative value lower than a predetermined first threshold during deceleration traveling of said vehicle.

2. A control device for a hybrid vehicle having an engine and a motor for outputting power for driving said vehicle, wherein a regenerative brake is used during deceleration traveling of said vehicle in accordance with a deceleration state thereof, and said engine includes at least one deactivatable cylinder which is deactivatable during deceleration traveling of said vehicle, said control device comprising:

a deactivation determining, section for determining whether said deactivatable cylinder is allowed to be deactivated in accordance with a traveling state of said vehicle;

a deactivation cancellation determining section for canceling cylinder deactivation during deactivation operation;

a master vac negative pressure sensing section for measuring negative pressure in a master vac which communicates with an intake passage of said engine and which assists a braking force by means of intake depression in accordance with a braking operation by an operator of said vehicle; and a control valve operating section for opening/closing a secondary air passage of said engine for providing auxiliary air into said intake passage by operating a secondary air valve, wherein said control valve operating section operates said secondary air valve so as to close said secondary air passage when the negative pressure in said master vac measured by said master vac negative pressure sensing section is a negative value higher than a predetermined second threshold during deceleration traveling of said vehicle.

3. A control device for a hybrid vehicle having an engine and a motor for outputting power for driving said vehicle, wherein a regenerative brake is used during deceleration traveling of said vehicle in accordance with a deceleration state thereof, and said engine includes at least one deactivatable cylinder which is deactivatable during deceleration traveling of said vehicle, said control device comprising:

a deactivation determining section for determining whether said deactivatable cylinder is allowed to be deactivated in accordance with a traveling state of said vehicle;

a deactivation cancellation determining section for canceling cylinder deactivation during deactivation operation;

an intake pressure sensing section for measuring air pressure in an intake passage of said engine;

a master vac negative pressure sensing section for measuring negative pressure in a master vac which communicates with an intake passage of said engine and which assists braking force by means of intake depression in accordance with a braking operation by an operator of said vehicle; and a control valve operating section for opening/closing a secondary air passage of said engine for providing auxiliary air into said intake passage by operating a secondary air valve, wherein said control valve operating section operates said secondary air valve so as to close said secondary air passage when the intake pressure measured by said intake pressure sensing section is a negative value lower than a predetermined first threshold and the negative pressure in said master vac measured by said master vac negative pressure sensing section is a negative value higher than a predetermined second threshold during deceleration traveling of said vehicle.

4. A control system as claimed in any one of claims 1 to 3, wherein said control valve operating section operates said secondary air valve so as to close said secondary air passage when cylinder deactivation is prohibited by said deactivation determining section.

5. A control system as claimed in claim 1 or 3, wherein said first threshold is determined in accordance with a running speed of said engine.

6. A control system as claimed in claim 2 or 3, wherein said second threshold is determined in accordance with a traveling speed of said vehicle.

7. A control system as claimed in any one of claims 1 to 3, wherein said control system further comprises a deceleration state determining section for determining a degree of deceleration of said vehicle, and wherein said deactivation cancellation determining section cancels cylinder deactivation when the degree of deceleration exceeds a predetermined value.

* * * * *